(12) United States Patent
Takata et al.

(10) Patent No.: US 12,735,063 B2
(45) Date of Patent: Sep. 15, 2026

(54) USE RECOMMENDATION APPARATUS AND VEHICLE

(71) Applicant: SUBARU CORPORATION, Tokyo (JP)

(72) Inventors: Tomomi Takata, Tokyo (JP); Yasuhiro Taguchi, Tokyo (JP); Kou Sasaki, Tokyo (JP); Yoshikatsu Nishiyama, Tokyo (JP); Yuta Takenoya, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 19/252,654

(22) Filed: Jun. 27, 2025

(65) Prior Publication Data

US 2026/0015006 A1 Jan. 15, 2026

(30) Foreign Application Priority Data

Jul. 10, 2024 (JP) ................................ 2024-110691

(51) Int. Cl.
*B60W 50/14* (2020.01)
*G10L 13/027* (2013.01)

(52) U.S. Cl.
CPC ........... *B60W 50/14* (2013.01); *G10L 13/027* (2013.01)

(58) Field of Classification Search
CPC ............................ B60W 50/14; G10L 13/027
USPC ........................................................ 340/439
See application file for complete search history.

(56) References Cited

U.S. PATENT DOCUMENTS

| | | | | |
|---|---|---|---|---|
| 8,630,768 | B2 * | 1/2014 | McClellan | G08G 1/096725 340/439 |
| 11,710,082 | B2 * | 7/2023 | Simoncini | B60W 40/09 340/439 |
| 2022/0118963 | A1 * | 4/2022 | Sugimoto | B60W 50/14 |
| 2022/0203888 | A1 * | 6/2022 | Tanimura | B60K 35/10 |
| 2023/0219564 | A1 * | 7/2023 | Baumann | B60W 30/09 701/26 |
| 2023/0406343 | A1 * | 12/2023 | Oman | B60W 40/105 |
| 2024/0034307 | A1 * | 2/2024 | Szlachetka | B60W 30/06 |

FOREIGN PATENT DOCUMENTS

| | | |
|---|---|---|
| JP | 2023-066938 A | 5/2023 |
| JP | 2023-072633 A | 5/2023 |

* cited by examiner

*Primary Examiner* — Naomi J Small
(74) *Attorney, Agent, or Firm* — Rimon P.C.

(57) ABSTRACT

A use recommendation apparatus includes acquiring circuitry and processing circuitry. The processing circuitry generates a degree of necessity of a recommendation of a use of a predetermined operation device, based on sensor data, traffic data, and non-traffic data acquired by the acquiring circuitry; selects, when the degree of necessity is greater than or equal to a first threshold and less than or equal to a second threshold, a predetermined pacing model from a plurality of pacing models, based on the sensor data, the traffic data, and the non-traffic data; acquires, from the predetermined pacing model, a first recommendation sentence having undergone predetermined pacing processing as a recommendation sentence that recommends the use of the predetermined operation device by inputting the sensor data, the traffic data, and the non-traffic data to the predetermined pacing model; and outputs the first recommendation sentence.

5 Claims, 9 Drawing Sheets

USE RECOMMENDATION APPARATUS AND VEHICLE

CROSS-REFERENCE TO RELATED APPLICATIONS

The present application claims priority from Japanese Patent Application No. 2024-110691 filed on Jul. 10, 2024, the entire contents of which are hereby incorporated by reference.

BACKGROUND

The disclosure relates to a use recommendation apparatus and a vehicle.

Research and development in various driver assistance systems have been made to reduce drivers' loads and accidents. Non-limiting examples of the driver assistance system include a preceding-vehicle following system, a lane keeping system, and an automated driving system.

These driver assistance systems, which are convenient and useful for drivers, recommend the drivers to use the driver assistance system via human machine interfaces (HMIs). Japanese Unexamined Patent Application Publication (JP-A) Nos. 2023-072633 and 2023-066938 each disclose a technique of recommending the use of the driver assistance system via the HMI.

SUMMARY

An aspect of the disclosure provides a use recommendation apparatus configured to be applied to a vehicle. The use recommendation apparatus includes acquiring circuitry and processing circuitry. The acquiring circuitry is configured to acquire, sensor data to be acquired from a sensor of the vehicle when a subject is driving the vehicle, traffic data on a surrounding environment around the vehicle to be acquired when the subject is driving the vehicle, and non-traffic data including one or more of: usage data to be recorded in a user terminal upon a use of the user terminal by the subject; passenger data on a passenger of the vehicle to be acquired when the subject is driving the vehicle; and action data on an action of the subject to be acquired when the subject is not driving the vehicle. The processing circuitry is configured to process the sensor data, the traffic data, and the non-traffic data acquired by the acquiring circuitry. The processing circuitry is configured to: generate a degree of necessity of a recommendation of a use of a predetermined operation device, based on the sensor data, the traffic data, and the non-traffic data; select, when the degree of necessity is greater than or equal to a first threshold and less than or equal to a second threshold, a predetermined pacing model from a plurality of pacing models, based on the sensor data, the traffic data, and the non-traffic data; acquire, from the predetermined pacing model, a first recommendation sentence having undergone predetermined pacing processing as a recommendation sentence that recommends the use of the predetermined operation device by inputting the sensor data, the traffic data, and the non-traffic data to the predetermined pacing model; and output the first recommendation sentence.

An aspect of the disclosure provides a vehicle including a use recommendation apparatus. The use recommendation apparatus includes acquiring circuitry and processing circuitry. The acquiring circuitry is configured to acquire, sensor data to be acquired from a sensor of the vehicle when a subject is driving the vehicle, traffic data on a surrounding environment around the vehicle to be acquired when the subject is driving the vehicle, and non-traffic data including one or more of: usage data to be recorded in a user terminal upon a use of the user terminal by the subject; passenger data on a passenger of the vehicle to be acquired when the subject is driving the vehicle; and action data on an action of the subject to be acquired when the subject is not driving the vehicle. The processing circuitry is configured to process the sensor data, the traffic data, and the non-traffic data acquired by the acquiring circuitry. The processing circuitry is configured to: generate a degree of necessity of a recommendation of a use of a predetermined operation device, based on the sensor data, the traffic data, and the non-traffic data; select, when the degree of necessity is greater than or equal to a first threshold and less than or equal to a second threshold, a predetermined pacing model from a plurality of pacing models, based on the sensor data, the traffic data, and the non-traffic data; acquire, from the predetermined pacing model, a first recommendation sentence having undergone predetermined pacing processing as a recommendation sentence that recommends the use of the predetermined operation device by inputting the sensor data, the traffic data, and the non-traffic data to the predetermined pacing model; and output the first recommendation sentence.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

Figure 1:
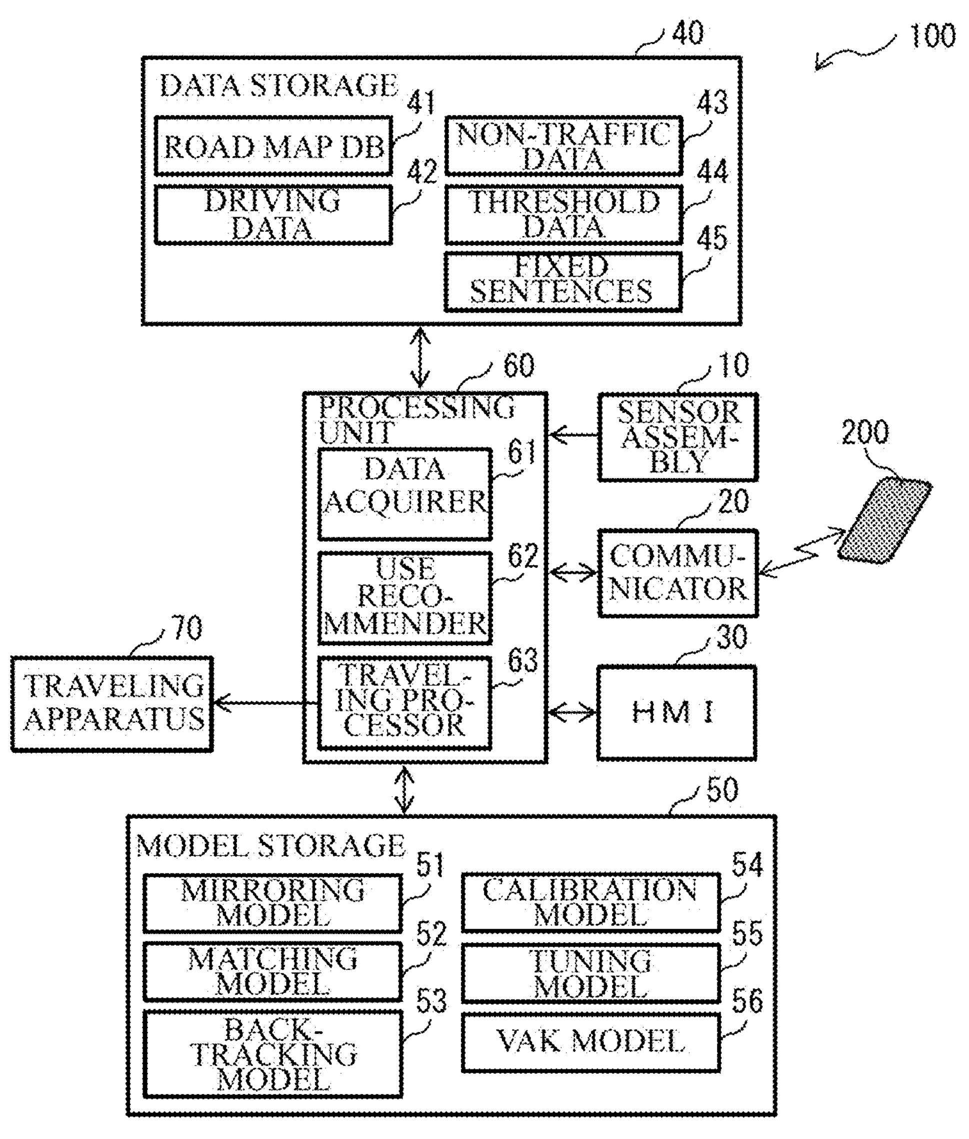
FIG. 1 is a block diagram illustrating a configuration example of a vehicle according to one example embodiment of the disclosure.

Research and development in various driver assistance systems have been made to reduce drivers' loads and accidents. Non-limiting examples of the driver assistance system include a preceding-vehicle following system, a lane keeping system, and an automated driving system.

These driver assistance systems, which are convenient and useful for drivers, recommend the drivers to use the driver assistance system to via human machine interfaces (HMIs). Japanese Unexamined Patent Application Publication (JP-A) Nos. 2023-072633 and 2023-066938 each disclose a technique of recommending the use of the driver assistance system via the HMI.

JP-A No. 2023-072633 discloses a technique of recommending a driver to learn a function not in use of a vehicle, and allowing the driver to select whether to learn the function not in use. However, JP-A No. 2023-072633 fails to disclose re-recommending learning the function refused by the driver and to suggest a method of re-recommending learning the function refused by the driver.

JP-A No. 2023-066938 discloses a technique of recommending a driver to implement a recommended function. However, JP-A No. 2023-066938 fails to disclose re-recommending implementing the recommended function refused by the driver, and to suggest a method of re-recommending implementing the recommended function refused by the driver.

As described above, these existing techniques fail to disclose or suggest measures to re-recommend the use of the function refused by the driver. It is desirable to provide a use recommendation apparatus and a vehicle that each make it possible to encourage the use of a driver assistance system not in use.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

Note that the description will be given in the following order.

1. Example Embodiment (FIGS. 1 to 5)

An example in which the use of a driver assistance system not in use is encouraged using pacing 2. Modification Example (FIGS. 6 to 9)

Modification Example 1: An example in which a first threshold Nth1 (to be described later) is changed Modification Example 2: An example in which a determination model 81Ai (to be described later) is retrained using a corrected degree of necessity Ni (to be described later)

Figure 6:
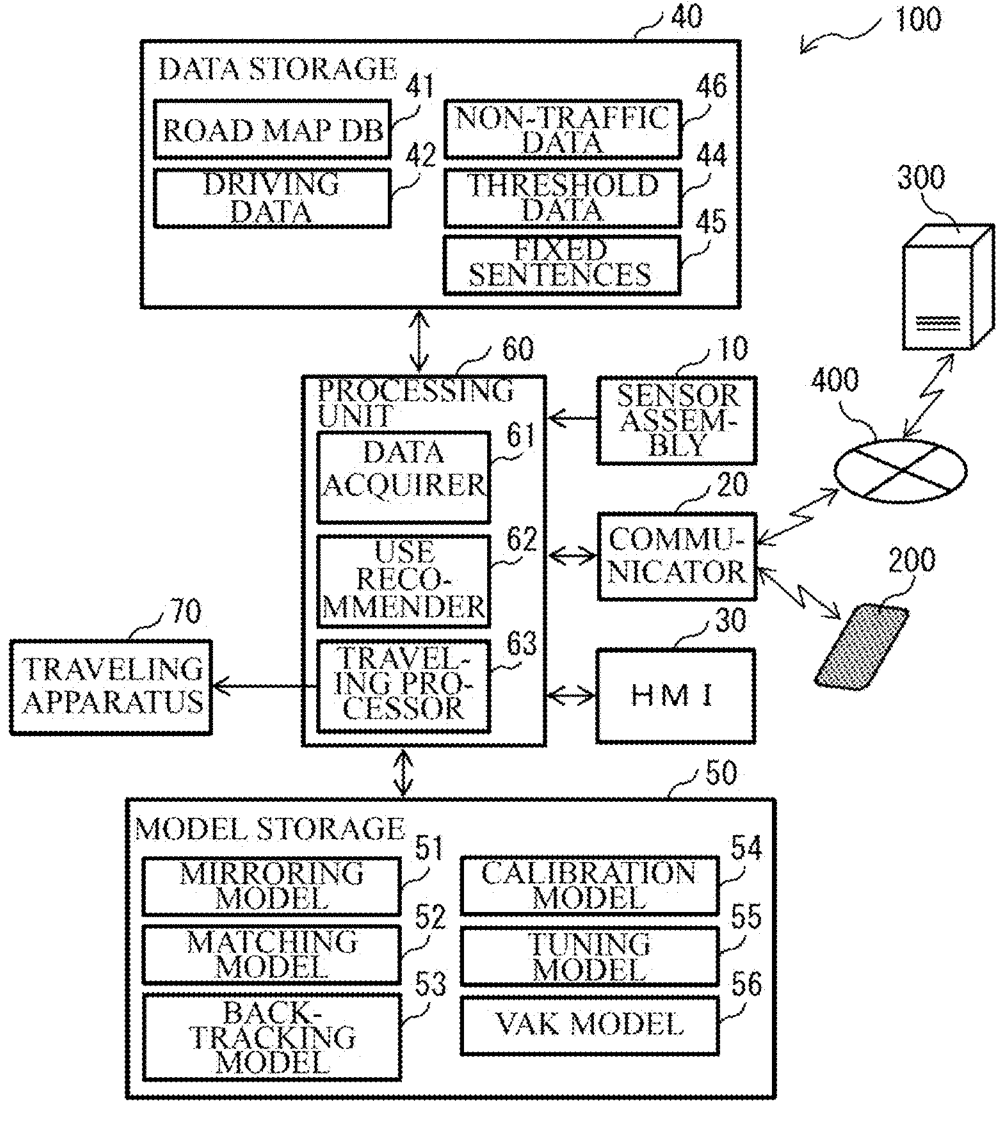
FIG. 6 is a block diagram illustrating a modification example of the configuration of the vehicle illustrated in FIG. 1.
Figure 7:
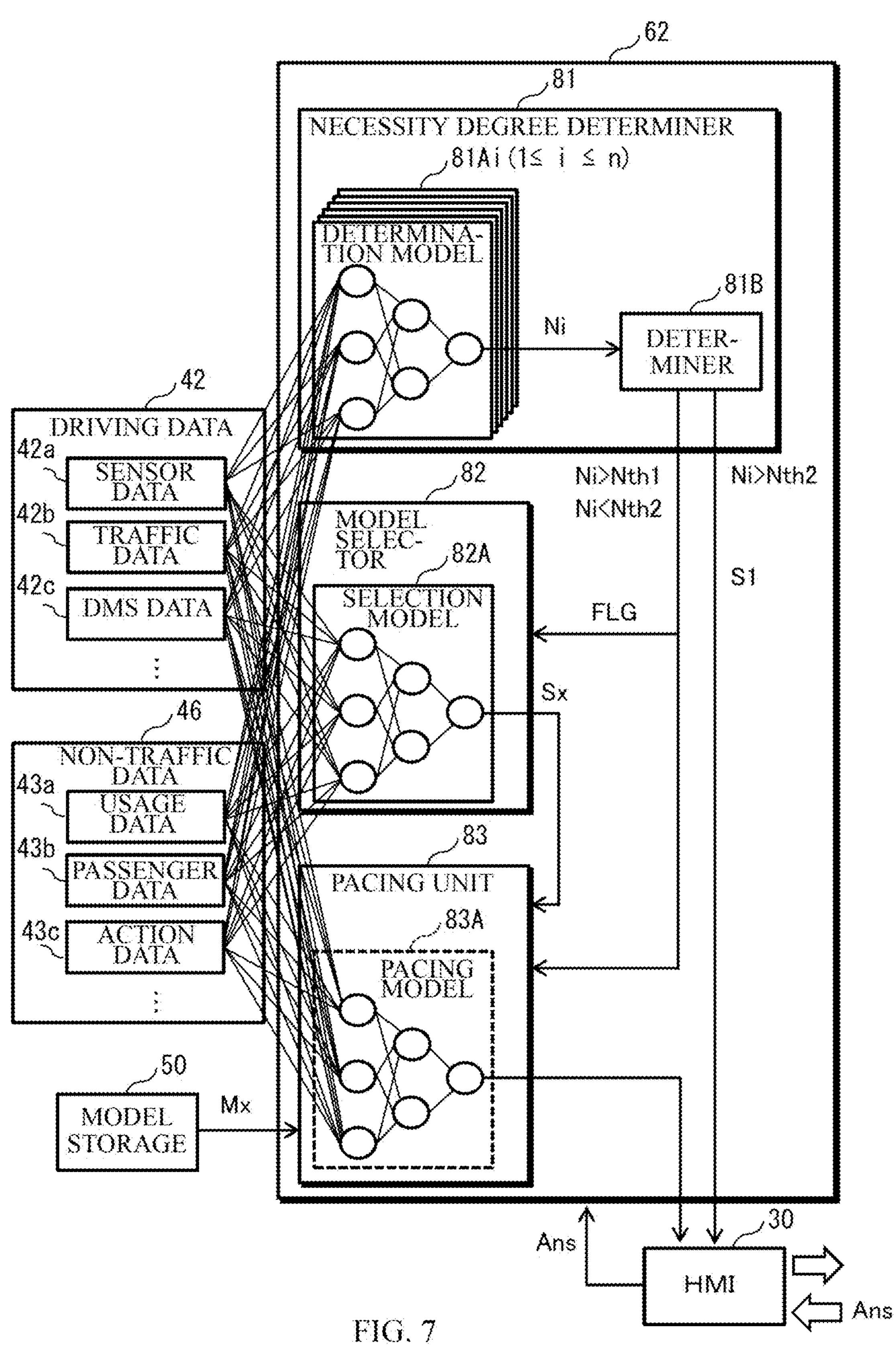
FIG. 7 is a block diagram illustrating a configuration example of a use recommender illustrated in FIG. 6 and examples of data to be used in the use recommender illustrated in FIG. 6.

Modification Example 3: An example in which non-traffic data held in a server apparatus 300 (to be described later) is used upon pacing (FIGS. 6 and 7)

Figure 8:
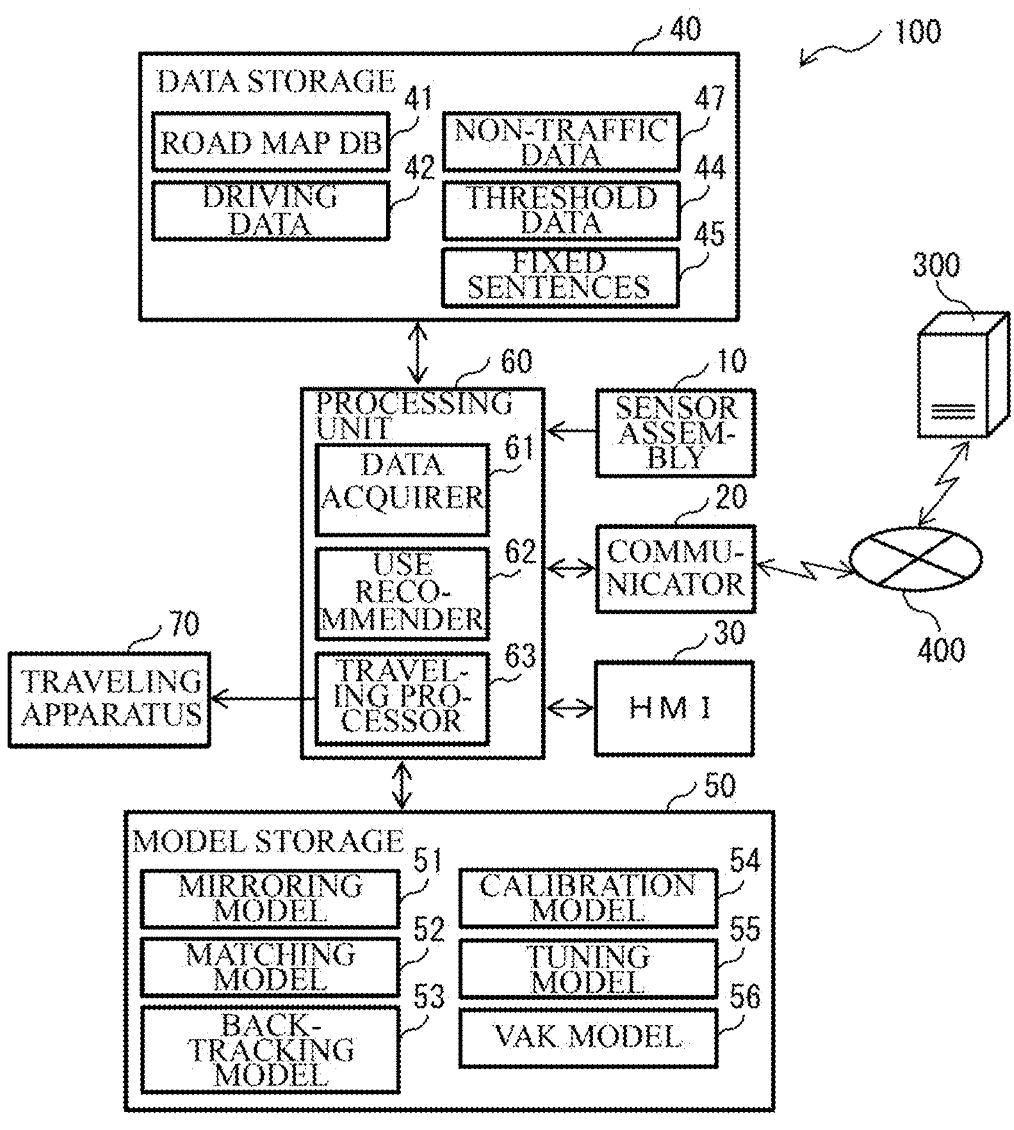
FIG. 8 is a block diagram illustrating a modification example of the configuration of the vehicle illustrated in FIG. 1.
Figure 9:
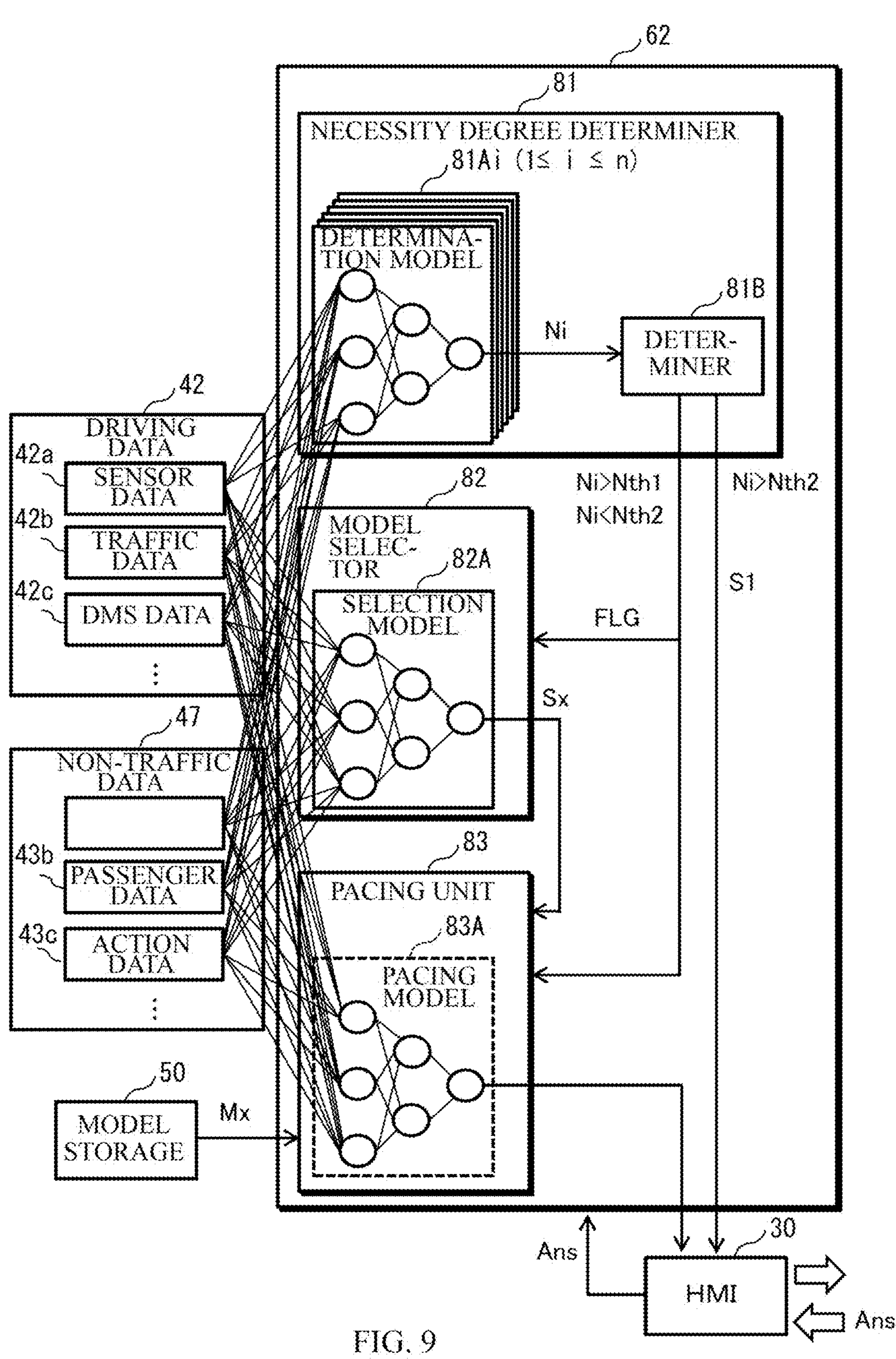
FIG. 9 is a block diagram illustrating a configuration example of a use recommender illustrated in FIG. 8 and examples of data to be used in the use recommender illustrated in FIG. 8.

Modification Example 4: An example in which a portable terminal 200 is not used (FIGS. 8 and 9)

1. EXAMPLE EMBODIMENT

<Configuration>

FIG. 1 is a block diagram illustrating a configuration example of a vehicle 100 according to an example embodiment of the disclosure. In one embodiment, the vehicle 100 may serve as a “vehicle”. In one embodiment, a driver who drives the vehicle 100 (hereinafter simply referred to as a “driver”) may serve as a “subject”. When there are multiple occupants in the vehicle 100, one or more occupants other than the driver among the multiple occupants are passengers of the vehicle 100. In one embodiment, the one or more passengers in the vehicle 100 may serve as “passengers”. As illustrated in FIG. 1, for example, the vehicle 100 may include a sensor assembly 10, a communicator 20, a human machine interface (HMI) 30, a data storage 40, a model storage 50, a processing unit 60, and a traveling apparatus 70.

The sensor assembly 10 may include various sensors mounted in the vehicle 100. Non-limiting examples of the sensor assembly 10 may include a vehicle speed sensor, an acceleration sensor, an angular velocity sensor, a steering angular velocity sensor, and a steering torque sensor. In some embodiments, the sensor assembly 10 may include other sensors in place of or in addition to the sensors described above. The various sensors in the sensor assembly 10 may acquire data when the driver is driving the vehicle 100. In one embodiment, the data acquired by the sensors in the sensor assembly 10 may serve as “sensor data”.

The vehicle speed sensor may detect a speed of the vehicle 100 (hereinafter referred to as a “vehicle speed”). The vehicle speed sensor may output time-series data on the detected vehicle speed (hereinafter referred to as “vehicle speed data”) to the processing unit 60. The acceleration sensor may detect an acceleration rate applied to the vehicle 100. The acceleration sensor may output time-series data on acceleration rates detected in three directions (hereinafter referred to as “acceleration data”) to the processing unit 60. The angular velocity sensor may detect an angular velocity of the vehicle 100. The angular velocity sensor may output time-series data on three detected angular velocities (i.e., a yaw angular velocity, a roll angular velocity, and a pitch angular velocity) (hereinafter referred to as “angular velocity data”) to the processing unit 60.

The steering angular velocity sensor may detect the rotation speed of a steering angle of a steering wheel (hereinafter referred to as a “steering wheel angle”) of the vehicle 100. The steering angular velocity sensor may output time-series data on the detected steering angular velocity to the processing unit 60. The steering torque sensor may detect steering torque generated by a steering operation performed by the driver. The steering torque sensor may output time-series data on the detected steering torque (hereinafter referred to as “steering torque TR”) to the processing unit 60.

Figure 2:
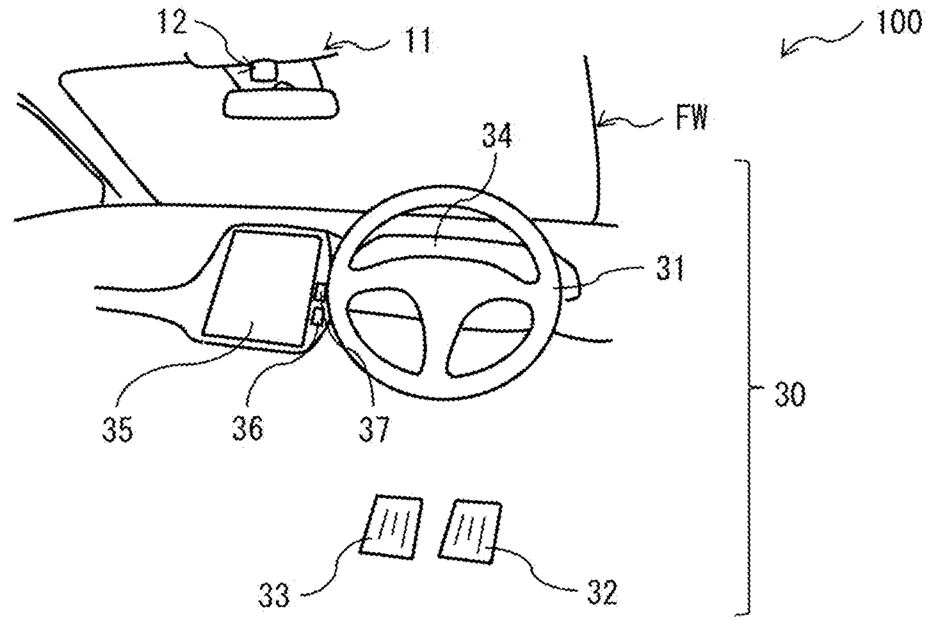
FIG. 2 is a diagram illustrating exemplary appearances of a driver seat and its peripheral equipment in a vehicle compartment of the vehicle illustrated in FIG. 1.

As illustrated in FIG. 2, for example, the sensor assembly 10 may further include a stereo camera 11 and a traveling environment detector mounted in the vehicle 100. The stereo camera 11 may be an autonomous sensor that senses a real space outside the vehicle 100. In some embodiments, the stereo camera 11 may include a pair of cameras disposed laterally symmetrically with each other about a widthwise-center of the vehicle 100, and capture a pair of stereo images of a frontal area ahead of the vehicle 100 from different lines of sight. The stereo camera 11 may output data on the pair of stereo images thus captured (hereinafter referred to as "image data Da") to the processing unit 60.

The stereo camera 11 may generate distance image data Db from the amount of positional shift of a target object, based on the image data Da (the pair of stereo images). The traveling environment detector may include a processing unit such as a graphics processing unit (GPU) or a micro processing unit (MPU). In some embodiments, the traveling environment detector may detect a lane dividing line that divides a road around the vehicle 100, based on the distance image data Db. The traveling environment detector may further detect road curvatures of right and left lane dividing lines that define a traveling road (traveling lane) on which the vehicle 100 travels, and a width between the right and left lane dividing lines (i.e., vehicle width). The traveling environment detector may further conduct predetermined pattern matching on the distance image data Db to thereby detect lanes or three-dimensional objects, such as structures, present around the vehicle 100.

In the detection of three-dimensional objects, the traveling environment detector may detect, for example but not limited to, a type of the three-dimensional object, a distance to the three-dimensional object, a speed of the three-dimensional object, and a relative distance between the three-dimensional object and the vehicle 100. Non-limiting examples of the three-dimensional object to be detected by the traveling environment detector may include a traffic light, an intersection, a road sign, a stop line, another vehicle, a pedestrian, a bicycle, and a building. Non-limiting examples of the building may include a single house, an apartment, a commercial facility, a factory, and a sign board. The traveling environment detector may output traveling environment information on the surroundings of the vehicle 100 including the detected three-dimensional object, to the processing unit 60.

As illustrated in FIG. 2, for example, the sensor assembly 10 may further include an in-vehicle camera 12, a sound collection microphone, and an occupant detector that are mounted in the vehicle 100. The in-vehicle camera 12 may be an autonomous sensor that senses a real space inside the vehicle 100. In some embodiments, the in-vehicle camera 12 may be a monocular camera disposed at the widthwise center of the vehicle 100, and capture an image of an entire interior of the vehicle 100 (image data Dc). The in-vehicle camera 12 may output the image data Dc to the occupant detector and the processing unit 60. In some embodiments, the sound collection microphone may collect a sound or voice generated by the occupant inside the vehicle 100 to generate sound data Dd, and output the sound data Dd to the occupant detector and the processing unit 60.

The occupant detector may include a processing unit such as a GPU or a MPU. The occupant detector may detect one or more occupants in the vehicle 100, based on the image data Dc, for example. In some embodiments, the occupant detector may analyze an attribute and action of each detected occupant, based on the image data Dc and the sound data Dd, generate attribute data, a sound history, and an action history of each occupant, and output these pieces of data to the processing unit 60. In one embodiment, the attribute data, the sound history, and the action history of the driver among the occupants of the vehicle 100 may serve as "driver monitoring system (DMS) data". In one embodiment, the attribute data, the sound history, and the action history of the one or more passengers other than the driver of the vehicle 100 may serve as "passenger data".

The attribute data of the occupant may include data such as an identifier indicating the driver, an identifier indicating a passenger who is an occupant other than the driver among the occupants of the vehicle 100 and who is a family member of the driver, or an identifier indicating a passenger who is an occupant other than the driver among the occupants of the vehicle 100 and who is not a family member of the driver. The sound history may include data such as a voice type, a voice tone, a speaking speed, or a kind of dialect of each occupant of the vehicle 100. The action history may include data such as a facial expression, a posture, an action habit, a sign of drowsiness, or an eating behavior of each occupant of the vehicle 100.

The communicator 20 may acquire complementary data that complements data not obtainable from the image data Da and the distance image data Db via communication such as inter-vehicular communication, road-to-vehicle communication, satellite communication, or short-range wireless communication. The communicator 20 may output the complementary data to the processing unit 60.

The communicator 20 may receive data acquired by another vehicle (e.g., data on a position or speed of the other vehicle) via communication such as inter-vehicular communication. In some embodiments, the communicator 20 may receive positioning signals emitted from multiple positioning satellites via satellite communication.

The communicator 20 may acquire road map data on roads around the vehicle 100 via communication such as road-to-vehicle communication. In some embodiments, the road map data may include high-definition road map data (dynamic map) that includes road data and traffic data. The road data may include static data and quasi-static data. The traffic data may include quasi-dynamic data and dynamic data.

The static data in the road data may include data to be updated within a month or earlier, such as data on roads, structures on the roads, structures on the sides of the roads, lanes, road surfaces, or permanent traffic regulations. Non-limiting examples of the data on roads may include data on positions or shapes of the roads, intersections, and attributes of the roads (e.g., national roads, prefectural roads, private roads, priority roads, non-priority roads, public roads, expressways, the number of lanes, the presence or absence of a center divider, the presence or absence of a right-turn lane, fixed-time roads, or roads with separated lanes for vehicles and pedestrians). Non-limiting examples of the data on structures on the roads may include data on traffic signs, traffic lights, curve mirrors, crossover bridges, and trash collection sites. Non-limiting examples of the data on structures on the sides the roads may include data on various kinds of buildings and parks.

The quasi-static data in the road data may include data to be updated within an hour or earlier, such as data on traffic regulations put into effect due to roadworks or other events, wide-area weather, or traffic congestion prediction.

The quasi-static data in the traffic data may include data to be updated within a minute or earlier, such as data on actual traffic conditions and actual traffic regulations at measurement times, fallen objects or obstacles, temporal traveling troubles, accidents actually happened, or narrow-area weather.

The dynamic data in the traffic data may include data to be updated within a second or earlier, such as data transmitted or exchanged between mobile bodies, data on a traffic signal currently indicated, data on pedestrians or bicycles in intersections, or data on vehicles traveling on roads. The road map data including these kinds of data may be maintained and updated in a cycle of data reception from each of the other vehicles, and the updated road map data may be transmitted to each of the other vehicles via the communicator 20 as appropriate.

The communicator 20 may acquire data held in the portable terminal 200 upon the use of the portable terminal 200 by the driver (hereinafter referred to as "usage data") from the portable terminal 200 via short-range wireless communication between digital devices, such as Bluetooth (registered trademark). In one embodiment, the portable terminal 200 may serve as a "user terminal". In one embodiment, the usage data may serve as "usage data". Non-limiting examples of the usage data may include a voice history of conversations made by the driver in three days including a day of the acquisition of the usage data from the portable terminal 200, and an action history of driver's actions in these three days. The voice history included in the usage data may include data on features of a driver's voice, such as a voice type, a voice tone, a speaking speed, or a kind of dialect. The action history included in the usage data may include data such as GPS data or map data on a history of places that the driver has visited in the three days described above.

As illustrated in FIG. 2, the HMI 30 may include components including a steering wheel 31, an accelerator pedal 32, a brake pedal 33, a meter panel display 34, a center panel display 35, a speaker 36, and a microphone 37. The meter panel display 34 may include a display panel such as a liquid crystal display panel or an organic electroluminescent (EL) display panel, and display information such as a vehicle speed or an engine revolution number. The center panel display 35 may include a display panel such as a liquid crystal display panel or an organic EL display panel configured to receive touch inputs. Various settings may be made to the vehicle 100 by using the center panel display 35.

The data storage 40 may include a memory such as a non-volatile memory, an electrically erasable programmable read-only memory (EEPROM), a flash memory, or a resistance random access memory. As illustrated In FIG. 1, for example, the data storage 40 may hold a road map database (DB) 41, driving data 42, non-traffic data 43, threshold data 44, and fixed sentences 45.

The road map DB 41 may include high-definition road map data (dynamic map). The high-definition road map data may include, for example but not limited to, road map data received from an external device via road-to-vehicle communication, road data including static data and quasi-static data, and traffic data including quasi-dynamic data and dynamic data.

The driving data 42 may include, for example but not limited to, the sensor data (sensor data 42*a*) on the surroundings of the vehicle 100 received from the sensor assembly 10, the traffic data (traffic data 42*b*) on the surrounding environment around the vehicle 100 detected when the driver is driving the vehicle 100, and the DMS data (DMS data 42*c*) on the driver received from the sensor assembly 10. In one embodiment, the sensor data 42*a* may serve as "sensor data". The traffic data 42*b* may include the road data and the traffic data described above among data acquired by a data acquirer 61 to be described later. In one embodiment, the traffic data 42*b* may serve as "traffic data on a surrounding environment around the vehicle".

The non-traffic data 43 may include usage data 43*a* held in the portable terminal 200 upon the use of the portable terminal 200 by the driver, and passenger data 43*b* on the passenger of the vehicle 100 detected when the driver is driving the vehicle 100. In one embodiment, the non-traffic data 43 may serve as "non-traffic data". The usage data 43*a* may be acquired from the portable terminal 200 via the communicator 20. In one embodiment, the usage data 43*a* may serve as "usage data". The passenger data 43*b* may include the voice history and the action history of the passenger detected by in-vehicle sensors of the sensor assembly 10, such as the in-vehicle camera, the sound collection microphone, or the occupant detector. In one embodiment, the passenger data 43*b* may serve as "passenger data".

The threshold data 44 may include, for example but not limited to, a threshold Nth1 and a threshold Nth2. These thresholds Nth1 and Nth2 may be compared with an output value of a determination model 81Ai ($1 \le i \le n$, where n is the number of pacing models held in the model storage 50 to be described later). In one embodiment, the threshold Nth1 may serve as a "first threshold". The threshold Nth2 may be greater than the threshold Nth1. In one embodiment, the threshold Nth2 may serve as a "second threshold". In some embodiments, the threshold Nth1 may be set to 0.4 as default, and the threshold Nth2 may be set to 0.8 as default.

The fixed sentences 45 may include multiple fixed sentences to be presented to the driver to encourage the use of the driver assistance system not in use. The fixed sentences 45 may include, for example but not limited to, multiple recommendation sentences and multiple answer sentences. Non-limiting examples of the multiple recommendation sentences included in the fixed sentences 45 may include "Want to use an automated driving system?", "Want to use a preceding-vehicle following system?", and "Want to use a lane keeping system?". Non-limiting examples of the answer sentences included in the fixed sentences 45 may include "Your request is accepted." In one embodiment, the automated driving system, the preceding-vehicle following system, and the lane keeping system may each serve as an "operation device" usable in the vehicle 100.

The model storage 50 may include a memory such as a non-volatile memory, an EEPROM, a flash memory, or a resistance random access memory. The model storage 50 may hold multiple pacing models. As illustrated in FIG. 1, non-limiting examples of the pacing models held in the model storage 50 may include a mirroring model 51, a matching model 52, a back-tracking model 53, a calibration model 54, a tuning model 55, and a visual auditory kinesthetic (VAK) model 56.

The term "pacing" used herein may refer to matching a pace, such as a voice tone, a speaking speed, or the contents of a talk, with a psychological state of the driver in communicating with the driver. The pacing model may be a trained model configured to, when receiving a fixed sentence A and various kinds of data necessary for the pacing of the fixed sentence A, output a modified sentence B generated by conducting pacing processing on the fixed sentence A in accordance with driver's features included in the received data. Non-limiting examples of the data on the driver's features may include data on a facial expression, a posture, an action habit, a voice type, a voice tone, a speaking speed, and a kind of dialect of the driver.

The pacing model may be a model trained based on training data that includes: the driving data 42 (training driving data) and the non-traffic data 43 (training non-traffic data) acquired in various past scenes; training fixed sentences; and training modified sentences generated by conducting predetermined pacing processing on the training fixed sentences. Further, the pacing model may be a model re-trained based on training data that includes: the driving data 42 and the non-traffic data 43 in the data storage 40; a recommendation sentence (fixed sentence S1); a recommendation sentence (fixed sentence S2) generated by conducting the predetermined pacing processing on the recommendation sentence (fixed sentence S1); and an identifier (content of response) indicating whether the driver has accepted the recommendation sentence (fixed sentence S2). When receiving the driving data 42 and the non-traffic data 43 in the data storage 40 having been updated after the re-training and the recommendation sentence (fixed sentence S1), the pacing model may output a new recommendation sentence (fixed sentence S2) generated by conducting the predetermined pacing processing on the received recommendation sentence (fixed sentence S1).

When receiving the driving data 42, the non-traffic data 43, and the text data (fixed sentence), the mirroring model 51 may generate voice data (e.g., a modified sentence generated by modifying the fixed sentence) on a way of speaking and the contents of talk matching with the facial expression, posture, or action habit of the driver included in the driving data 42 and the non-traffic data 43.

When receiving the driving data 42, the non-traffic data 43, and the text data (fixed sentence), the matching model 52 may generate voice data (e.g., a modified sentence generated by modifying the fixed sentence) on a way of speaking and the contents of talk matching with the voice type, voice tone, speaking speed, or kind of dialect of the driver included in the driving data 42 and the non-traffic data 43.

When receiving the driving data 42, the non-traffic data 43, and the text data (fixed sentence), the back-tracking model 53 may generate voice data (e.g., a modified sentence generated by modifying the fixed sentence) including the fixed sentence A to be reproduced in a way of speaking matching with the voice type, voice tone, speaking speed, or kind of dialect of the driver included in the driving data 42 and the non-traffic data 43.

When receiving the driving data 42, the non-traffic data 43, and the text data (fixed sentence), the calibration model 54 may generate voice data (e.g., a modified sentence generated by modifying the fixed sentence) on a way of speaking and the contents of talk taking into consideration the psychological state of the driver estimated from the driving data 42 and the non-traffic data 43.

When receiving the driving data 42, the non-traffic data 43, and the text data (fixed sentence), the tuning model 55 may generate voice data (e.g., a modified sentence generated by modifying the fixed sentence) on a way of speaking and the contents of talk in accordance with the psychological state of the driver estimated from the driving data 42 and the non-traffic data 43.

When receiving the driving data 42, the non-traffic data 43, and the text data (fixed sentence), the VAK model 56 may generate voice data (e.g., a modified sentence generated by modifying the fixed sentence) on a way of speaking and the contents of talk matching with a driver's predominance (any one of visual, auditory, and kinesthetic).

The processing unit 60 may control an overall operation of the vehicle 100. In some embodiments, the processing unit 60 may be a so-called electric control unit (ECU), and include one or more processors and one or more memories. In some embodiments, the processing unit 60 may include a central processing unit (CPU), and the processing unit 60 may control the overall operation of the vehicle 100 by executing a program held in the memory.

In some embodiments, the processing unit 60 may include a locator unit. The locator unit may acquire position coordinates of the vehicle 100, based on positioning signals received via the communicator 20. The locator unit may estimate a position of the vehicle 100 on a road map by matching the position coordinates of the vehicle 100 to the route map data. The locator unit may acquire map data covering a predetermined region including the vehicle 100 from the map data held in the road map DB 41, based on the position coordinates of the vehicle 100.

In an environment, such as inside a tunnel, where it is difficult to receive effective positioning signals from the positioning satellites, the locator unit may be switched to an autonomous navigation mode in which the position of the vehicle 100 is estimated based on the vehicle speed, the angular velocity, and the longitudinal acceleration rate detected by the sensor assembly 10, to thereby estimate the position of the vehicle 100 on the road map.

After estimating the position of the vehicle 100, based on the positioning signals received via the communicator 20 or the data detected by the sensor assembly 10, the locator unit may determine a road type of the traveling road on which the vehicle 100 is traveling.

The locator unit may update the road map data held in the road map DB41, using the road map data acquired through external communication, such as road-to-vehicle communication or inter-vehicular communication, via the communicator 20. The update may be applied to not only the static data but also the quasi-static data, the quasi-dynamic data, and the dynamic data. This allows the road map data to include road information and traffic information acquired through communication with an external device, achieving substantially real-time update of information on mobile bodies such as vehicles traveling on the road.

The locator unit may verify the road map data, based on the traveling environment information recognized as described above, and update the road map data held in the road map DB 41 to the latest state. The update may be applied to not only the static data but also the quasi-static data, the quasi-dynamic data, and the dynamic data. This achieves real-time update of the information on mobile bodies such as vehicles traveling on the road recognized as described above.

As illustrated in FIG. 1, for example, the processing unit 60 may further include a traveling processor 63. In some embodiments, the traveling processor 63 may include an accelerator processor, a brake processor, and a steering processor, and control the traveling apparatus 70 using these processors. In some embodiments, the traveling apparatus 70 may include a power device, a brake device, and an EPS motor.

The accelerator processor may control torque of the power device included in the traveling apparatus 70, based on request torque corresponding to an amount of depression of the accelerator pedal by the driver who drives the vehicle 100. The power device may be configured to drive steered wheels of the vehicle 100. In some embodiments, the power device may drive the steered wheels of the vehicle 100 in accordance with the request torque received from the accelerator processor.

The brake processor may control torque of the brake device included in the traveling apparatus 70, based on request torque corresponding to an amount of depression of the brake pedal by the driver who drives the vehicle 100. The brake device may be configured to apply a brake to the steered wheels of the vehicle 100. In some embodiments, the brake device may apply a brake to the steered wheels of the vehicle 100 in accordance with the request torque received from the brake processor.

The steering processor may determine steering assist torque that assists steering torque generated by a steering operation performed by the driver, and set EPS torque corresponding to the determined steering assist torque. The steering processor may output a control signal to the EPS motor included in the traveling apparatus 70 to cause the EPS motor to output the set EPS torque. The EPS motor may control a steering angle of the steering wheel by generating output torque based on the control signal.

As illustrated in FIG. 1, for example, the processing unit 60 may include the data acquirer 61 and a use recommender 62. In one embodiment, the data acquirer 61 may serve as "acquiring circuitry". In one embodiment, the use recommender 62 may serve as "processing circuitry".

The data acquirer 61 may acquire data on a condition or state of the vehicle 100 on a periodic basis. In some embodiments, the data acquirer 61 may receive various kinds data acquired by the sensor assembly 10, various kinds of data acquired from an external device via the communicator 20, and various kinds of control signals directed to various devices in the vehicle 100, by periodic monitoring. The data acquirer 61 may further acquire map data on the surrounding environment around the vehicle 100 from the road map DB 41 in the data storage 40.

The data acquirer 61 may acquire the driving data 42 and the non-traffic data 43, based on the acquired data, such as the various kinds of data received from the sensor assembly 10, the various kinds of data received from the external device via the communicator 20, the various kinds of data received from the HMI 30, the various kinds of control signals directed to the various devices in the vehicle 100, or the map data received from the road map DB 41. The data acquirer 61 may store the driving data 42 and the non-traffic data 43 in the data storage 40, every time the driving data 42 and the non-traffic data 43 are acquired. In some embodiments, the data storage 40 may hold the driving data 42 and the non-traffic data 43 detected in three days.

Figure 3:
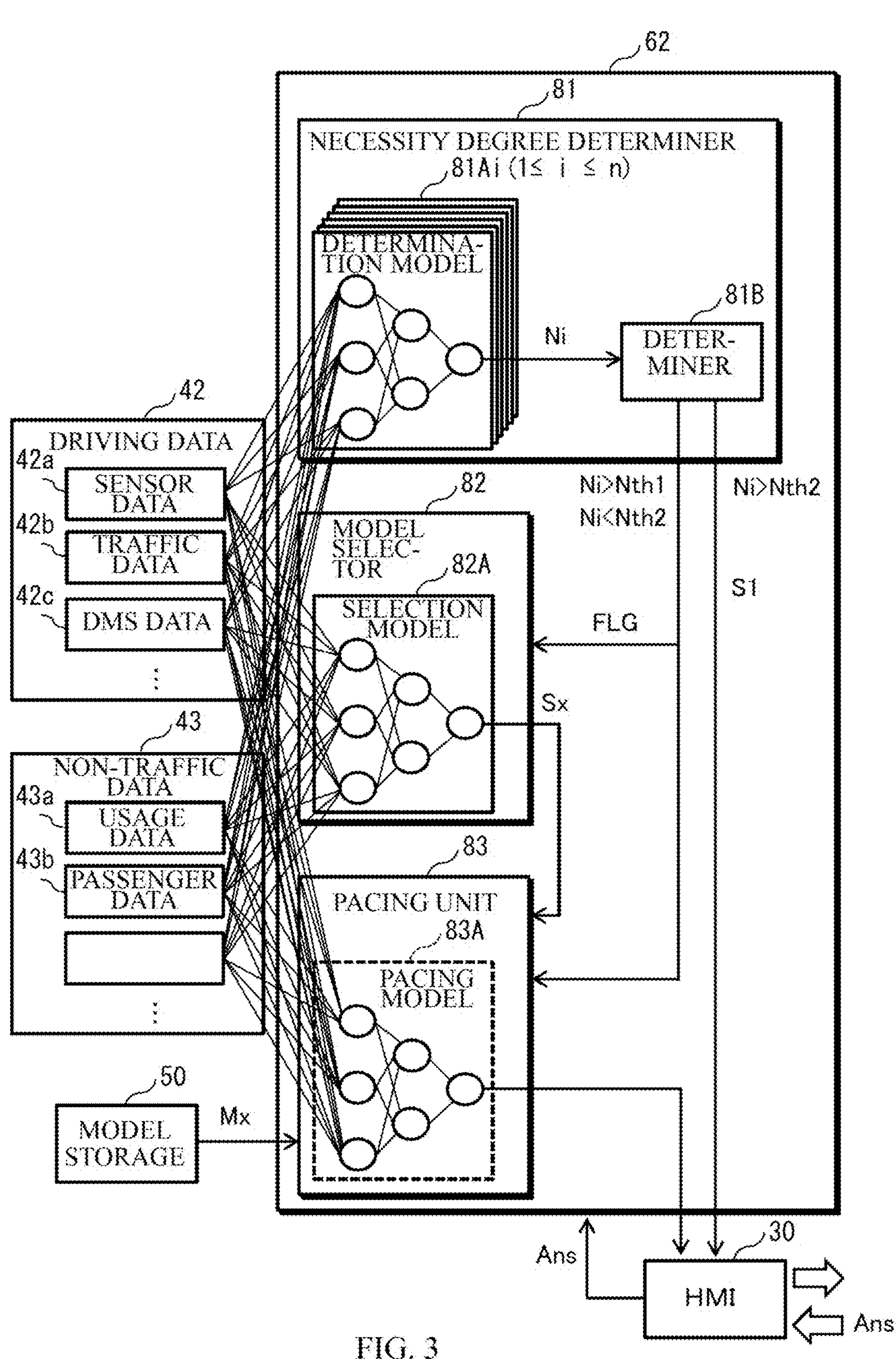
FIG. 3 is a block diagram illustrating a configuration example of a use recommender illustrated in FIG. 1 and examples of data to be used in the use recommender illustrated in FIG. 1.

The use recommender 62 may read the driving data 42 and the non-traffic data 43 from the data storage 40 and process the driving data 42 and the non-traffic data 43 read from the data storage 40. As illustrated in FIG. 3, for example, the use recommender 62 may include a necessity degree determiner 81, a model selector 82, and a pacing unit 83.

As illustrated in FIG. 3, for example, the necessity degree determiner 81 may include the N number of the determination models 81Ai ($1 \leq i \leq n$) and a determiner 81B. The N number of the determination models 81Ai may be assigned one by one to the respective pacing models held in the model storage 50. When receiving the driving data 42 and the non-traffic data 43 from the data storage 40, each of the determination models 81Ai may output the degree of necessity Ni (e.g., $0 \leq Ni \leq 1$) of the assigned pacing model, based on the received data.

The determination model 81Ai may be a model trained based on training data including the driving data 42 (training driving data) and the non-traffic data 43 (training non-traffic data) acquired in various past scenes, and the degree of necessity Ni (training degree of necessity) set based on the training driving data and the training non-traffic data. Further, the determination model 81Ai may be a model re-trained based on training data including the driving data 42 and the non-traffic data 43 in the data storage 40, and the degree of necessity Ni acquired by inputting the driving data 42 and the non-traffic data 43 from the data storage 40 to the determination model 81Ai. When receiving updates of the driving data 42 and the non-traffic data 43 from the data storage 40 after the re-training, the determination model 81Ai may generate an update of the degree of necessity Ni of the assigned pacing model, based on the received data, and output the updated degree of necessity Ni.

The necessity degree determiner 81 may generate the degree of necessity Ni of the recommendation of the use of a predetermined operation device, based on the driving data 42 and the non-traffic data 43 read from the data storage 40. The necessity degree determiner 81 may select an appropriate operation device from the plurality of operation devices, based on the driving data 42 and the non-traffic data 43. The necessity degree determiner 81 may input the driving data 42 and the non-traffic data 43 to the determination model 81Ai corresponding to the selected (predetermined) operation device (hereinafter referred to as "selected determination model 81Ai") to thereby acquire the degree of necessity Ni of the recommendation of the use of the predetermined operation device, as a response of the data inputted to the selected determination model 81Ai, from the selected determination model 81Ai.

The determiner 81B may compare the degree of necessity Ni with the thresholds Nth1 and Nth2. When the degree of necessity Ni is greater than the threshold Nth2, the determiner 81B may read the fixed sentence S1 included in the fixed sentences 45 from the data storage 40, and output the fixed sentence S1 to the HMI 30. When the degree of necessity Ni is less than the threshold Nth1, the determiner 81B may stop outputting the fixed sentence S1 (that is, output nothing). When the degree of necessity Ni is greater than or equal to the threshold Nth1 and less than or equal to the threshold Nth2, that is, when the degree of necessity Ni is within a pacing target range, the determiner 81B may output a flag FLG indicating that the degree of necessity Ni is within the pacing target range to the model selector 82. When the degree of necessity Ni is within the pacing target range, the determiner 81B may read the fixed sentence S1 included in the fixed sentences 45 from the data storage 40, and output the fixed sentence S1 to the pacing unit 83.

As illustrated in FIG. 3, for example, the model selector 82 may include a selection model 82A. When receiving the driving data 42 and the non-traffic data 43 from the data storage 40, the selection model 82A may select an appropriate one (hereinafter referred to as "pacing model 83A") of the pacing models held in the model storage 50, based on the received data, and output an identifier Sx of the selected pacing model 83A to the pacing unit 83.

When receiving the flag FLG from the determiner 81B, the model selector 82 may select a predetermined pacing model 83A from the pacing models held in the model storage 50, based on the driving data 42 and the non-traffic data 43. When receiving the flag FLG from the determiner 81B, the model selector 82 may input the driving data 42 and the non-traffic data 43 to the selection model 82A to thereby acquire the identifier Sx of the pacing model 83A appropriate to the received data, as a response to the received data, from the pacing model 83A.

When receiving the identifier Sx from the model selector 82, the pacing unit 83 may read a pacing model Mx (pacing model 83A) corresponding to the identifier Sx from the model storage 50. The pacing unit 83 may input the driving data 42, the non-traffic data 43, and the fixed sentence S1 to the read (selected) pacing model 83A, to thereby acquire, from the pacing model 83A, a modified sentence Sa generated by conducting the predetermined pacing processing on the fixed sentence S1, as the recommendation sentence that recommends the use of the operation device. The pacing unit 83 may output the acquired modified sentence Sa (recommendation sentence) to the HMI 30.

The use recommender 62 may acquire, from the HMI 30, an answer sentence Ans as a response of the driver to the modified sentence Sa. If the acquired answer sentence Ans indicates acceptance of the use of the operation device, the use recommender 62 may read the fixed sentence S2 indicating the acceptance and included in the fixed sentences 45 from the data storage 40, and output the fixed sentence S2 to the HMI 30. If the acquired answer sentence Ans indicates refusal of the use of the operation device, the use recommender 62 may read the fixed sentence S2 indicating the refusal and included in the fixed sentences 45 from the data storage 40, and output the fixed sentence S2 to the pacing unit 83.

When receiving the fixed sentence S2, the pacing unit 83 may input the driving data 42, the non-traffic data 43, and the fixed sentence S2 to the pacing model 83A, to thereby acquire, from the pacing model 83A, a modified sentence Sb generated by conducting the predetermined pacing processing on the fixed sentence S2, as an acknowledgement sentence indicating an acknowledgement of the refusal of the use of the operation device. The pacing unit 83 may output the acquired modified sentence Sb (acknowledgement sentence) to the HMI 30.

When receiving the fixed sentence S1 from the use recommender 62, the HMI 30 (speaker 36) may output the fixed sentence S1 in the form of a voice message. When receiving the modified sentence Sa from the use recommender 62, the HMI 30 (speaker 36) may output the modified sentence Sa in the form of a voice message. When receiving the modified sentence Sb from the use recommender 62, the HMI30 (speaker 36) may output the modified sentence Sb in the form of a voice message. When collecting the answer sentence Ans in the form of a voice message as the response to the modified sentence Sa from the driver, the HMI 30 (microphone 37) may output the collected answer sentence Ans to the use recommender 62.

Operation

Figure 4:
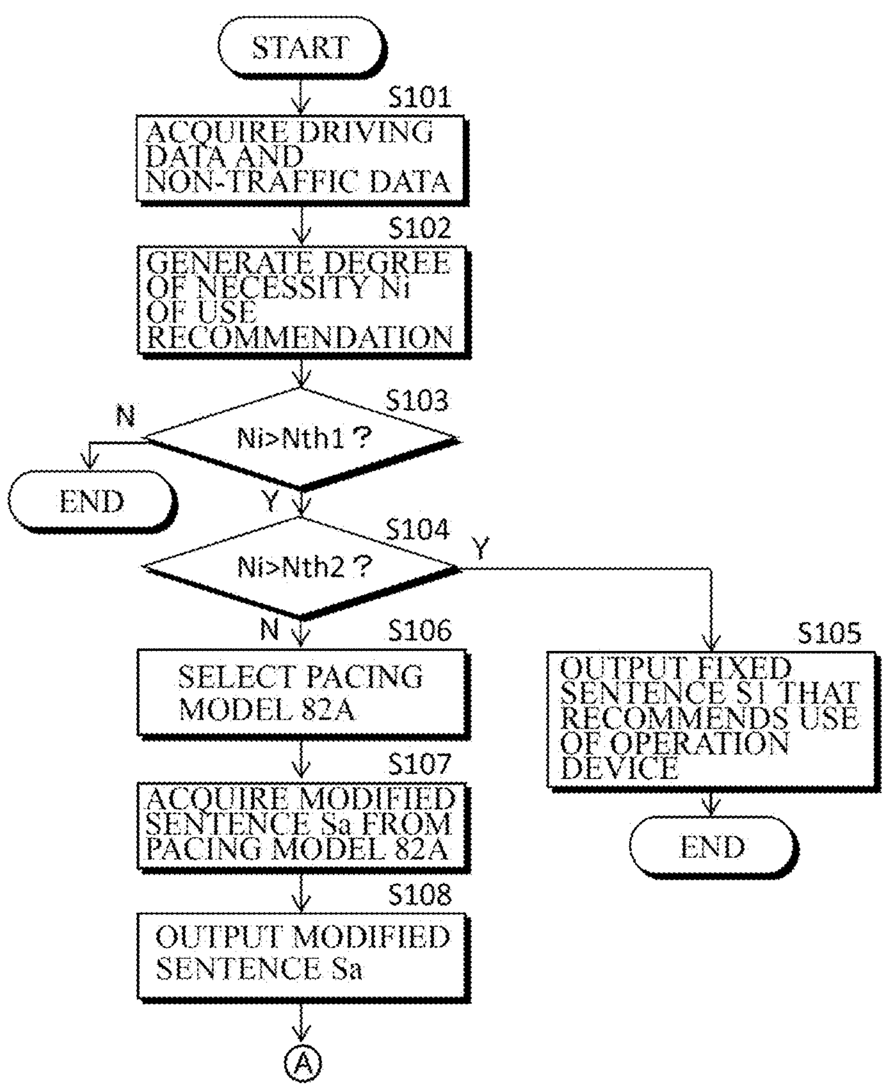
FIG. 4 is a flowchart of an exemplary process of encouraging the use of a driver assistance system of the vehicle illustrated in FIG. 1 not in use.
Figure 5:
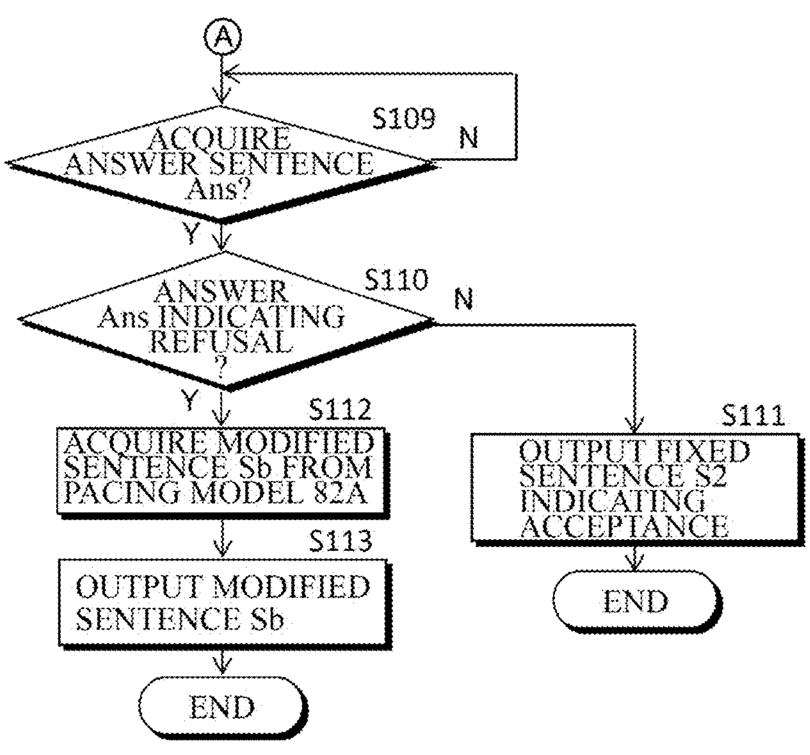
FIG. 5 is a flowchart of the exemplary process of encouraging the use of the driver assistance system subsequent to the flow illustrated in FIG. 4.

An exemplary operation of the processing unit 60 of the vehicle 100 will now be described with reference to FIG. 4. FIG. 4 illustrates an exemplary process of encouraging the use of a driver assistance system not in use in the vehicle 100.

The data acquirer 61 may acquire data from the sensor assembly 10, the communicator 20, and various devices in the vehicle 100 on a periodic basis. Non-limiting examples of the data acquired by the data acquirer 61 may include various kinds of data acquired from the sensor assembly 10, various kinds of data received from an external device via the communicator 20, various kinds of data acquired from the HMI 30, and various control signals directed to the various devices in the vehicle 100. The data acquirer 61 may further acquire the map data on the surrounding environment of the vehicle 100 from the road map DB 41 of the data storage 40. Further, the data acquirer 61 may acquire the driving data 42 and the non-traffic data 43, based on the acquired data. The data acquirer 61 may store the driving data 42 and the non-traffic data thus acquired in the data storage 40, every time the driving data 42 and the non-traffic data 43 are acquired.

The processing unit 60 may read the driving data 42 and the non-traffic data 43 from the data storage 40 (Step S101). The processing unit 60 may select an appropriate operation device from the plurality of operation devices, based on the driving data 42 and the non-traffic data 43. The processing unit 60 may input the driving data 42 and the non-traffic data 43 held in the data storage 40 to the determination model 81Ai corresponding to the selected operation device (predetermined operation device), to thereby acquire, from the determination model 81Ai, the degree of necessity Ni of the recommendation of the use of the predetermined operation device, as a response to the input data (Step S102).

The processing unit 60 may determine whether the degree of necessity Ni is greater than the threshold Nth1 (Step S103). If the degree of necessity Ni is greater than the threshold Nth1 (Step S103: Y), the processing unit 60 may determine whether the degree of necessity Ni is greater than the threshold Nth2 (Step S104). If the degree of necessity Ni is greater than the threshold Nth2 (Step S104: Y), the processing unit 60 may output the fixed sentence S1 that recommends the use of the predetermined operation device to the HMI 30 (Step S105). When receiving the fixed sentence S1 from the processing unit 60, the HMI 30 may output the fixed sentence S1 in the form of a voice message.

If the degree of necessity Ni is greater than or equal to the threshold Nth1 and less than or equal to the threshold Nth2 (Step S104: N), the processing unit 60 may select an appropriate pacing model 83A from the plurality of pacing models held in the model storage 50, based on the driving data 42 and the non-traffic data 43 (Step S106). In some embodiments, the processing unit 60 may select an appropriate pacing model 83A, using the selection model 82A.

The processing unit 60 may input the driving data 42, the non-traffic data 43, and the fixed sentence S1 to the pacing model 83A, to thereby acquire, from the pacing model 83A, the modified sentence Sa generated by conducting the predetermined pacing processing on the fixed sentence S1, as the recommendation sentence that recommends the use of the operation device (Step S107). The processing unit 60 may output the modified sentence Sa having undergone the predetermined pacing processing to the HMI 30 (Step S108). When receiving the modified sentence Sa from the processing unit 60, the HMI 30 may output the modified sentence Sa in the form of a voice message.

The processing unit 60 may determine whether a response (answer sentence Ans) of the driver to the modified sentence Sa has been acquired from the HMI 30 (Step S109). If the answer sentence Ans has been received from the HMI 30 (Step S109: Y), the processing unit 60 may determine whether the answer sentence Ans indicates the refusal of the use of the operation device (Step S110). If the answer sentence Ans indicates the acceptance of the use of the operation device (Step S110: N), the processing unit 60 may output the fixed sentence S2 indicating the acceptance to the HMI 30 (Step S111).

If the answer sentence Ans indicates the refusal of the use of the operation device (Step S110: Y), the processing unit 60 may input the driving data 42, the non-traffic data 43, and the fixed sentence S2 to the pacing model 83A, to thereby acquire, from the pacing model 83A, the modified sentence Sb generated by conducting the predetermined pacing processing on the fixed sentence S2, as an acknowledgement sentence indicating an acknowledgement of the refusal of the use of the operation device (Step S112). The processing unit 60 may output the modified sentence Sb having undergone the predetermined pacing processing to the HMI 30 (Step S113). When receiving the modified sentence Sb from the processing unit 60, the HMI 30 may output the modified sentence Sb in the form of a voice message. In this way, the use of the driver assistance system not in use in the vehicle 100 may be encouraged.

Effects

Some effects of the vehicle 100 according to the present example embodiment will now be described.

In the present example embodiment, the degree of necessity Ni of the recommendation of the use of the predetermined operation device is generated based on the driving data 42 and the non-traffic data 43. If the degree of necessity Ni is greater than or equal to the threshold Nth1 and less than or equal to the threshold Nth2, the driving data 42 and the non-traffic data 43 are inputted to the predetermined pacing model 83A selected based on the driving data 42 and the non-traffic data 43, to thereby acquire, from the predetermined pacing model 83A, the recommendation sentence (modified sentence Sa) having undergone the predetermined pacing processing as the recommendation sentence that recommends the use of the operation device. This helps to increase the possibility of the recommendation sentence (modified sentence Sa) having undergone the predetermined pacing processing to be pleasantly accepted by the driver without making the driver feel unpleasant. It is therefore possible to encourage the use of the driver assistance system not in use.

In the present example embodiment, the determination model 81Ai may be the trained model to be re-trained based on the training data including the driving data 42, the non-traffic data 43, and the degree of necessity Ni. When updates of the driving data 42 and the non-traffic data 43 are inputted to the determination model 81Ai, an update of the degree of necessity Ni may be acquired from the determination model 81Ai. This allows the degree of necessity Ni corresponding to various kinds of the driving data 42 and various kinds of the non-traffic data 43 to be acquired, providing the recommendation sentence (modified sentence Sa) highly likely to be pleasantly accepted by the driver without making the driver feel unpleasant. It is therefore possible to encourage the use of the driver assistance system not in use.

In the present example embodiment, the pacing model 83A may be the trained model to be re-trained based on the training data including the driving data 42, the non-traffic data 43, the recommendation sentence (fixed sentence S1), the recommendation sentence (modified sentence Sa), and the identifier (content of response) indicating whether the driver has accepted the recommendation sentence (fixed sentence S2). When updates of the driving data 42 and the non-traffic data 43 and the recommendation sentence (fixed sentence S1) are inputted to the pacing model 83A, an update of the recommendation sentence (fixed sentence S1) may be acquired. This allows a driver's preference to be reflected in the recommendation sentence (modified sentence Sa), providing the recommendation sentence (modified sentence Sa) highly likely to be pleasantly accepted by the driver without making the driver feel unpleasant. It is therefore possible to encourage the use of the driver assistance system not in use.

In the present example embodiment, the plurality of pacing models held in the model storage 50 may include one or more of the mirroring model, the matching model, the back-tracking model, the calibration model, the tuning model, and the VAK model. This allows the driver's preference to be reflected in the recommendation sentence (modified sentence Sa), providing the recommendation sentence (modified sentence Sa) highly likely to be pleasantly accepted by the driver without making the driver feel unpleasant. It is therefore possible to encourage the driver assistance system not in use.

In the present example embodiment, if the degree of necessity Ni is less than the threshold Nth1, the output of the recommendation sentence (fixed sentence S1) may be stopped. That is, the recommendation of the use of the driver assistance system may not be made when the driver has no intention of using the driver assistance system. This helps to prevent the driver from feeling unpleasant.

In the present example embodiment, if the degree of necessity Ni is greater than the threshold Nth2, the fixed recommendation sentence may be outputted as the recommendation sentence that recommends the use of the operation device. That is, the pacing may not be performed when the driver has an intention of using the driver assistance system. It is therefore possible to encourage the use of the driver assistance system not in use without performing the pacing processing.

In the present example embodiment, the usage data **43*a* acquired from the portable terminal 200 via the communicator 20** may include the voice history of conversations made by the driver. This allows the pacing to be performed in accordance with the features of the driver's voice, such as the voice type, the voice tone, the speaking speed, or the kind of dialect. This helps to increase the possibility of the recommendation sentence (modified sentence Sa) having undergone the predetermined pacing processing to be pleasantly accepted by the driver without making the driver feel unpleasant. It is therefore possible to encourage the use of the driver assistance system not in use.

In the present example embodiment, the passenger data **43*b* acquired from the in-vehicle camera 12 may include the one or more attributes of one or more passengers in the vehicle 100** driven by the driver. This allows the psychological state of the driver generated when the one or more passengers are family members of the driver to be reflected in the recommendation sentence (modified sentence Sa). This helps to increase the possibility of the recommendation sentence (modified sentence Sa) in which the psychological state has been reflected to be pleasantly accepted by the driver without making the driver feel unpleasant. It is therefore possible to encourage the use of the driver assistance system not in use.

2. MODIFICATION EXAMPLES

Modification Example 1

According to Modification Example 1, in a case where the degree of necessity Ni is greater than or equal to the threshold Nth1 and less than or equal to the threshold Nth2 and where the response of the driver to the output of the recommendation sentence (modified sentence Sa) is a refusal of the use of a predetermined operation device, the necessity degree determiner 81 described in the foregoing example embodiment may change the threshold Nth1 in the threshold data 44 held in the data storage 40 to a value less than a default value of the threshold Nth1. This enlarges the pacing target range. It is therefore possible to encourage the use of the driver assistance system not in use while reducing the possibility of making the driver feel unpleasant, using the pacing.

Modification Example 2

According to Modification Example 2, in a case where the degree of necessity Ni is greater than or equal to the threshold Nth1 and less than or equal to the threshold Nth2 and where the response of the driver to the output of the recommendation sentence (modified sentence Sa) is a refusal of the use of a predetermined operation device, the necessity degree determiner 81 described in the foregoing example embodiment and Modification Example 1 may be configured to re-learn the determination model 81Ai, based on the training data including: the driving data 42 and the non-traffic data 43 in the data storage 40; and a value less by a predetermined value than the degree of necessity Ni acquired by inputting the driving data 42 and the non-traffic data 43 from the data storage 40 to the determination model 81Ai. This increases the possibility of the degree of necessity Ni to be out of the pacing target range. It is therefore possible to reduce the possibility of the recommendation sentence (modified sentence Sa) that makes the driver feel unpleasant to be presented to the driver.

Modification Example 3

According to Modification Example 3, the data storage 40 described in the foregoing example embodiment and Modification Examples 1 and 2 may hold non-traffic data 46 instead of the non-traffic data 43, as illustrated in FIG. 6, for example. The non-traffic data 46 may include the usage data 43*a*, the passenger data 43*b*, and action data 43*c*, as illustrated in FIG. 7, for example. The action data 43*c* may be data on driver's actions detected when the driver is not driving the vehicle 100. In some embodiments, the action data 43*c* may be data on driver's actions in three days when the driver has not driven the vehicle 100. The action data 43*c* may include one or more of: data to be acquired when the driver is in the vehicle 100 as a passenger; data to be acquired when the driver is in another vehicle than the vehicle 100 as a passenger; and data to be acquired when the driver is in neither the vehicle 100 nor the other vehicle.

In some embodiments, the action data 43*c* may be held in the server apparatus 300 communicable with the vehicle 100 via a network 400 as illustrated in FIG. 6. When the action data 43*c* is held in the server apparatus 300, the processing unit 60 may acquire the action data 43*c* from the server apparatus 300 via the communicator 20 and the network 400, and store the acquired action data 43*c* in the data storage 40.

The "data acquired when the driver has boarded the vehicle 100 as a passenger" may include, for example but not limited to, a history of driver's voices and a history of driver's actions. The "data acquired when the driver has boarded another vehicle than the vehicle 100 as a passenger" may include, for example but not limited to, a history of driver's voices and a history of driver's actions. The "history of driver's voices" may include, for example but not limited to, a voice type, a voice tone, a speaking speed, and a kind of dialect of the driver. The "history of driver's actions" may include, for example but not limited to, a facial expression, a posture, an action habit, a sign of drowsiness, and an eating behavior of the driver.

The "data acquired when the driver has boarded neither the vehicle 100 nor the other vehicle" may include, for example but not limited to, a history of driver's actions. The "history of driver's actions" may include, for example but not limited to, GPS data or map data on a history of places where the driver has visited in three days.

According to Modification Example 3, the non-traffic data 46 may be used instead of the non-traffic data 43, in the use recommender 62. This achieves more detailed recognition of the features of the driver, increasing the possibility of the recommendation sentence (modified sentence Sa) having undergone the predetermined pacing processing to be pleasantly accepted by the driver without making the driver feel unpleasant. It is therefore possible to encourage the use of the driver assistance system not in use.

Modification Example 4

According to Modification Example 4, the data storage 40 described in the foregoing example embodiment and Modification Examples 1 and 2 may hold non-traffic data 47 instead of the non-traffic data 43, as illustrated in FIG. 8, for example. The non-traffic data 47 may include the passenger data 43*b* and the action data 43*c*, as illustrated in FIG. 9, for example. That is, the non-traffic data 47 may include no usage data 43 acquired from the portable terminal 200, and the portable terminal 200 may not be coupled to the communicator 20, as illustrated in FIG. 8, for example. Even in the embodiment in which the usage data 43*a* is not acquired from the portable terminal 200, the action data 43*c* may be used instead of the usage data 43*a*. This helps to increase the possibility of the recommendation sentence (modified sentence Sa) having undergone the predetermined pacing processing to be pleasantly accepted by the driver without making the driver feel unpleasant. It is therefore possible to encourage the use of the driver assistance system not in use.

Although some embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

The limitations in the claims are to be interpreted broadly based on the language employed in the claims and not limited to examples described in this specification or during the prosecution of the application, and the examples are to be construed as non-exclusive.

As used in this specification and the appended claims, the singular forms "a", "an", and "the" include, especially in the context of the claims, are to be construed to cover both the singular and the plural, unless otherwise indicated herein or clearly contradicted by context.

Throughout this specification and the appended claims, unless the context requires otherwise, the terms "comprise", "include", "have", and their variations are to be construed to cover the inclusion of a stated element, integer, or step but not the exclusion of any other non-stated element, integer, or step.

The use of the terms first, second, etc. does not denote any order or importance, but rather the terms first, second, etc. are used to distinguish one element from another.

The terms "substantially", "approximately", "about", and their variants having similar meanings thereto are defined as being largely but not necessarily wholly what is specified as understood by one of ordinary skill in the art.

The terms "disposed on/provided on/formed on" and its variants having similar meanings thereto as used herein refer to elements disposed directly in contact with each other or indirectly by having intervening structures therebetween.

The disclosure may include at least the following example configurations.

(1) A use recommendation apparatus to be applied to a vehicle, the use recommendation apparatus including:

acquiring circuitry configured to acquire sensor data to be acquired from a sensor of the vehicle when a subject is driving the vehicle, traffic data on a surrounding environment around the vehicle to be acquired when the subject is driving the vehicle, and non-traffic data including one or more of: usage data to be recorded in a user terminal upon a use of the user terminal by the subject; passenger data on a passenger of the vehicle to be acquired when the subject is driving the vehicle; and action data on an action of the subject to be acquired when the subject is not driving the vehicle; and processing circuitry configured to process the sensor data, the traffic data, and the non-traffic data acquired by the acquiring circuitry, in which the processing circuitry is configured to generate a degree of necessity of a recommendation of a use of a predetermined operation device, based on the sensor data, the traffic data, and the non-traffic data, select, when the degree of necessity is greater than or equal to a first threshold and less than or equal to a second threshold, a predetermined pacing model from a plurality of pacing models, based on the sensor data, the traffic data, and the non-traffic data, acquire, from the predetermined pacing model, a first recommendation sentence having undergone predetermined pacing processing as a recommendation sentence that recommends the use of the predetermined operation device by inputting the sensor data, the traffic data, and the non-traffic data to the predetermined pacing model, and output the first recommendation sentence.

(2) The use recommendation apparatus according to (1), in which the processing circuitry includes a first trained model to be re-trained based on training data including the sensor data, the traffic data, the non-traffic data, and the degree of necessity, and the processing circuitry is configured to acquire an update of the degree of necessity from the trained model by inputting updates of the sensor data, the traffic data, and the non-traffic data to the first trained model.

(3) The use recommendation apparatus according to (1) or (2), in which the acquiring circuitry is configured to acquire a response of the subject to an output of the first recommendation sentence, the predetermined pacing model includes a trained model to be re-trained based on training data, the training data including the sensor data, the traffic data, the non-traffic data, the first recommendation sentence, a fixed recommendation sentence including the first recommendation sentence having not undergone the predetermined pacing processing, and content of the response, and the predetermined pacing model is configured to output an update of the first recommendation sentence when receiving updates of the sensor data, the traffic data, and the non-traffic data, and the fixed recommendation sentence.

(4) The use recommendation apparatus according to any one of (1) to (3), further including a memory configured to hold the first threshold and the second threshold, in which the processing circuitry is configured to, when the response of the subject to the output of the first recommendation sentence indicates a refusal of the use of the predetermined operation device, change the first threshold held in the memory to a value less than the first threshold.

(5) The use recommendation apparatus according to any one of (1) to (4), in which the plurality of pacing models includes one or more of a mirroring model, a matching model, a back-tracking model, a calibration model, a tuning model, and a visual auditory kinesthetic model.

(6) The use recommendation apparatus according to any one of (1) to (5), in which the processing circuitry is configured to stop outputting the recommendation sentence when the degree of necessity generated by the acquiring circuitry is less than the first threshold.

(7) The use recommendation apparatus according to any one of (1) to (6), in which the processing circuitry is configured to, when the degree of necessity generated by the acquiring circuitry is greater than the second threshold, output a fixed recommendation sentence as the recommendation sentence that recommends the use of the predetermined operation device.

(8) The use recommendation apparatus according to any one of (1) to (7), in which the usage data includes a voice history of conversations made by the subject.

(9) The use recommendation apparatus according to any one of (1) to (8), in which the passenger data includes one or more attributes of one or more passengers in the vehicle driven by the subject.

(10) The use recommendation apparatus according to any one of (1) to (9), in which the action data includes one or more of: data to be acquired when the subject is in the vehicle as a passenger, data to be acquired when the subject is in another vehicle than the vehicle as a passenger, and data to be acquired when the subject is neither in the vehicle nor the another vehicle.

(11) A vehicle including a use recommendation apparatus, the use recommendation apparatus including:

acquiring circuitry configured to acquire sensor data to be acquired from a sensor of the vehicle when a subject is driving the vehicle, traffic data on a surrounding environment around the vehicle to be acquired when the subject is driving the vehicle, and non-traffic data including one or more of: usage data to be recorded in a user terminal upon a use of the user terminal by the subject; passenger data on a passenger of the vehicle to be acquired when the subject is driving the vehicle; and action data on an action of the subject to be acquired when the subject is not driving the vehicle; and processing circuitry configured to process the sensor data, the traffic data, and the non-traffic data acquired by the acquiring circuitry, in which the processing circuitry is configured to generate a degree of necessity of a recommendation of a use of a predetermined operation device, based on the sensor data, the traffic data, and the non-traffic data, select, when the degree of necessity is greater than or equal to a first threshold and less than or equal to a second threshold, a predetermined pacing model from a plurality of pacing models, based on the sensor data, the traffic data, and the non-traffic data, acquire, from the predetermined pacing model, a first recommendation sentence having undergone predetermined pacing processing as a recommendation sentence that recommends the use of the predetermined operation device by inputting the sensor data, the traffic data, and the non-traffic data to the predetermined pacing model, and output the first recommendation sentence.

The processing unit 60 illustrated in FIGS. 1, 6, and 8 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the processing unit 60 illustrated in FIGS. 1, 6, and 8. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the processing unit 60 illustrated in FIGS. 1, 6, and 8.

The invention claimed is:

1. A use recommendation apparatus configured to be applied to a vehicle, the use recommendation apparatus comprising:

acquiring circuitry configured to acquire sensor data to be acquired from a sensor of the vehicle when a subject is driving the vehicle, traffic data on a surrounding environment around the vehicle to be acquired when the subject is driving the vehicle, and non-traffic data comprising one or more of: usage data to be recorded in a user terminal upon a use of the user terminal by the subject; passenger data on a passenger of the vehicle to be acquired when the subject is driving the vehicle; and action data on an action of the subject to be acquired when the subject is not driving the vehicle; and processing circuitry configured to process the sensor data, the traffic data, and the non-traffic data acquired by the acquiring circuitry, wherein the processing circuitry is configured to generate a degree of necessity of a recommendation of a use of a predetermined operation device, based on the sensor data, the traffic data, and the non-traffic data, select, when the degree of necessity is greater than or equal to a first threshold and less than or equal to a second threshold, a predetermined pacing model from a plurality of pacing models, based on the sensor data, the traffic data, and the non-traffic data, acquire, from the predetermined pacing model, a first recommendation sentence having undergone predetermined pacing processing as a recommendation sentence that recommends the use of the predetermined operation device by inputting the sensor data, the traffic data, and the non-traffic data to the predetermined pacing model, and output the first recommendation sentence.

2. The use recommendation apparatus according to claim 1, wherein the processing circuitry comprises a trained model to be re-trained based on training data comprising the sensor data, the traffic data, the non-traffic data, and the degree of necessity, and the processing circuitry is configured to acquire an update of the degree of necessity from the trained model by inputting updates of the sensor data, the traffic data, and the non-traffic data to the trained model.

3. The use recommendation apparatus according to claim 1, wherein the acquiring circuitry is configured to acquire a response of the subject to an output of the first recommendation sentence, the predetermined pacing model comprises a trained model to be re-trained based on training data comprising the sensor data, the traffic data, the non-traffic data, the first recommendation sentence, a fixed recommendation sentence comprising the first recommendation sentence having not undergone the predetermined pacing processing, and content of the response, and the predetermined pacing model is configured to output an update of the first recommendation sentence when receiving updates of the sensor data, the traffic data, and the non-traffic data, and the fixed recommendation sentence.

4. The use recommendation apparatus according to claim 1, further comprising a memory configured to hold the first threshold and the second threshold, wherein the processing circuitry is configured to, when a response of the subject to an output of the first recommendation sentence indicates a refusal of the use of the predetermined operation device, change the first threshold held in the memory to a value less than the first threshold.

5. A vehicle comprising a use recommendation apparatus, the use recommendation apparatus comprising:

acquiring circuitry configured to acquire sensor data to be acquired from a sensor of the vehicle when a subject is driving the vehicle, traffic data on a surrounding environment around the vehicle to be acquired when the subject is driving the vehicle, and non-traffic data comprising one or more of: usage data to be recorded in a user terminal upon a use of the user terminal by the subject; passenger data on a passenger of the vehicle to be acquired when the subject is driving the vehicle; and action data on an action of the subject to be acquired when the subject is not driving the vehicle; and processing circuitry configured to process the sensor data, the traffic data, and the non-traffic data acquired by the acquiring circuitry, wherein the processing circuitry is configured to generate a degree of necessity of a recommendation of a use of a predetermined operation device, based on the sensor data, the traffic data, and the non-traffic data, select, when the degree of necessity is greater than or equal to a first threshold and less than or equal to a second threshold, a predetermined pacing model from a plurality of pacing models, based on the sensor data, the traffic data, and the non-traffic data, acquire, from the predetermined pacing model, a first recommendation sentence having undergone predetermined pacing processing as a recommendation sentence that recommends the use of the predetermined operation device by inputting the sensor data, the traffic data, and the non-traffic data to the predetermined pacing model, and output the first recommendation sentence.

* * * * *